(12) United States Patent
Amir et al.

(10) Patent No.: US 6,512,800 B1
(45) Date of Patent: Jan. 28, 2003

(54) METHOD AND SYSTEM FOR CORRECTING PHASE AND AMPLITUDE IMBALANCES OF A QUADRATURE MODULATED RF SIGNAL

(75) Inventors: Israel Amir, Princeton, NJ (US); Michael S. Heutmaker, Trenton, NJ (US); John Rolland Welch, Mt. Laurel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/267,280

(22) Filed: Mar. 12, 1999

(51) Int. Cl.[7] .......................... H04K 1/02; H04L 25/03; H04L 25/49
(52) U.S. Cl. .................. 375/296; 375/298; 375/235; 332/103
(58) Field of Search .................. 375/296, 298, 375/235, 295, 261, 284; 332/103, 123, 107, 159; 455/67.3

(56) References Cited

U.S. PATENT DOCUMENTS

| | | | |
|---|---|---|---|
| 5,351,016 A | * 9/1994 | Dent | 332/103 |
| 5,371,481 A | * 12/1994 | Tittanen et al. | 332/103 |
| 5,705,958 A | * 1/1998 | Janer | 332/103 |
| 6,208,698 B1 | * 3/2001 | Marchesani et al. | 375/298 |
| 6,222,878 B1 | * 4/2001 | McCallister et al. | 375/225 |

OTHER PUBLICATIONS

"Digital Techniques for Wideband Receivers" by James Tsui (1995), chapter 8, section 14, pp. 256–261.

* cited by examiner

Primary Examiner—Phuong Phu
(74) Attorney, Agent, or Firm—Woodbridge & Associates

(57) ABSTRACT

A method for correcting the phase and amplitude imbalance of a quadrature modulated RF signal requires that errors be induced in both amplitude, $\rho$, and in phase $\phi$ in at least three different combinations in order to determine the appropriate correction value for amplitude and phase offsets $\Delta$ and $\theta_e$. According to a first embodiment the same $\rho$ and $\phi$ offsets applied in three different combinations to determine the necessary $\Delta$ and $\theta_e$ corrections. According to a second embodiment, a fourth measurement is made in order to determine an unknown control scale factor for balance adjustments.

4 Claims, 4 Drawing Sheets

METHOD AND SYSTEM FOR CORRECTING PHASE AND AMPLITUDE IMBALANCES OF A QUADRATURE MODULATED RF SIGNAL

BACKGROUND OF THE INVENTION

1. Field of the Invention

The invention relates to a method for detecting and correcting phase and amplitude imbalances of a quadrature modulated RF signal.

2. Description of Related Art

Quadrature modulators are devices that are used in many digital wireless communication systems. They are used to form one signal containing a digital bit stream and a radio frequency carrier using in-phase (I) and quadrature (Q) input signals. The output is a modulated signal ready for transmission after amplification. In order to perform at their best, such modulators have to have the following three parameters (among others) under control:

a. amplitude imbalance—the I and Q channels must have equal amplitude gain;
b. quadrature error—deviation from the ideal 90° phase shift between the I and Q channels;
c. DC offset that is usually generated by the modulator itself and is a cause for degradation in carrier suppression. "Carrier suppression" is the leakage of the un-modulated RF signal through the modulator.

The cost of a quadrature modulator is largely determined by the quality of the foregoing parameters a–c. In order to reduce the cost of a transmitter, it is common to use lower cost modulators and actively correct the above parameters a–c in order to meet specifications.

Alternatively, it may be necessary to improve the performance of existing modulator hardware to allow accommodation of new standards, such as IS 136+. Accordingly, a means was needed to determine the extent to which a given quadrature modulator exhibited the foregoing parameters a–c and, if there are errors, to correct them quickly, preferably without time consuming trial and error search procedures.

The problems described above are generally related to the test and/or calibration of both base stations and terminals such as digital and phone transmitters.

In many practical cases, the prior art technique consisted primarily of trial and error. Many TDMA and CDMA transmitters have AC and DC I and Q inputs. A technician would typically apply a variety of offset signals, either manually or using a computer program, until all of the three parameters a–c were within acceptable limits. After that point, the transmitter calibration was complete. Unfortunately, the trial and error technique sometimes requires a large number of tests to bring an RF transmitter into alignment.

One example of a prior art correction technique is described in a book entitled "Digital Techniques for Wideband Receivers" by J. Tsui and is set forth in Chapter 8, Section 14, thereof and entitled "Digital Correction of IQ Channel Imbalance". This prior art technique uses an expression for time-domain modulator output as the starting point. By using a tone signal and comparing four measured time-domain samples to the modulator mathematical expression, it is possible to solve for the DC offset, IQ imbalance and quadrature error. This prior art method is best suited for receivers, for which time-domain samples are likely to be the normal output data of the unit under test. It is not believed that this technique is especially well suited for transmitters.

In contrast, the present invention is advantageous for transmitters, where the output signal is an RF carrier. In this case, according to the prior art, specialized instrumentation, such as a vector signal analyzer or a down converter and digitizer, would be needed to acquire the time samples. According to the present invention, however, various different embodiments thereof use three, four or five measurements, but these measurements correspond to different combinations of the probe value $\rho$ for amplitude imbalance and the probe value $\phi$ for quadrature error. One particular advantage of the present invention, therefore, is that the measurements may be performed using the most common transmitter test instruments—the RF spectrum analyzer. Furthermore, one embodiment of the present invention includes the scale factor to convert between the measured data and the control variables.

It was in the context of the foregoing problem that the present invention arose.

SUMMARY OF THE INVENTION

Briefly described, the invention comprises the use of three, and sometimes four, independent applications of two predetermined introduced errors both in amplitude, $\rho$, and in phase $\phi$ in order to completely define the phase and amplitude imbalance of the quadrature modulator. Knowing that, it is possible to determine how the input signal can be pre-distorted to correct for such imbalances. The present method is based upon the use of side-band suppression to measure the quadrature modulator performance. Three measurements are taken for three different pre-distorted input signals. The applied pre-distortion actively perturbs the amplitude and phase of the incoming signal. The solution of three simultaneous equations provides the needed phase and amplitude corrections. By means of a fourth perturbation it is also possible to correct for an unknown control scale factor for the balance adjustments if necessary.

The invention will be more fully understood by reference to the following drawings.

DETAILED DESCRIPTION OF THE PREFERRED EMBODIMENT

During the course of this description, like numbers will be used to identify like elements according to the different figures that illustrate the invention.

Figure 1A:
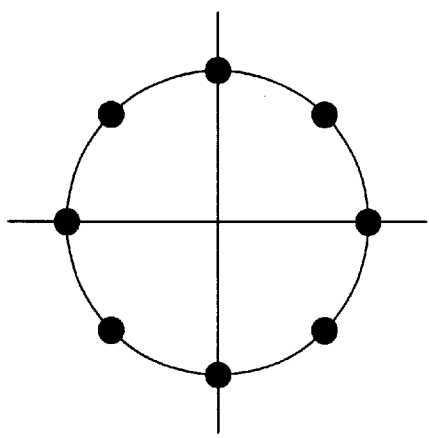
FIG. 1A is an eight point constellation for a $\pi/4$ DQPSK signal.
Figure 1B:
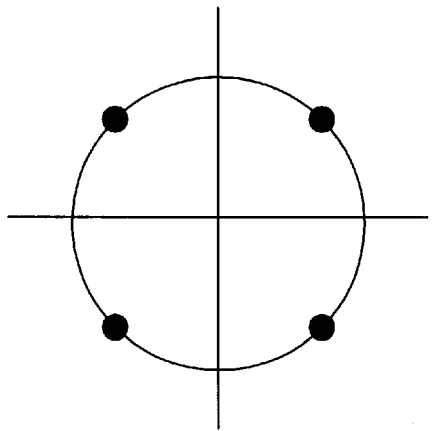
FIG. 1B is a four point reference constellation for a QPSK signal.

FIG. 1A illustrates an ideal quadrature modulated $\pi/4$ DQPSK signal comprising a constellation of eight undistorted signal points in the I and Q plane. While such a signal is described with reference to the preferred embodiments of the invention, nevertheless, the basic teaching could also apply to a QPSK signal comprising a constellation of four undistorted signal points in the I and Q plane as illustrated in FIG. 1B.

Figure 2A:
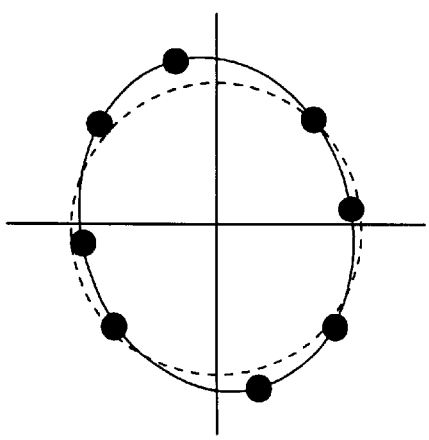
FIG. 2A illustrates the effect of amplitude imbalance and quadrature error on a $\pi/4$ DQPSK signal.
Figure 2B:
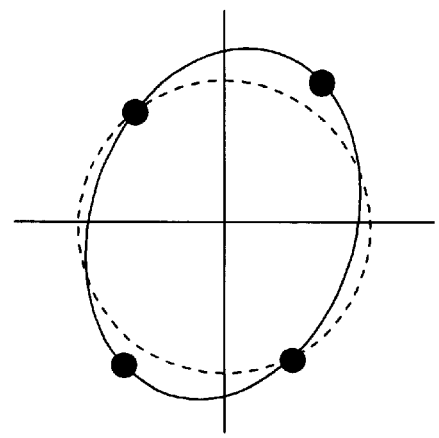
FIG. 2B illustrates the effect of amplitude imbalance and quadrature error on a QPSK signal.

FIG. 2A illustrates the same eight point π/4 DQPSK signal as illustrated in FIG. 1A but with amplitude imbalance $\Delta$ and quadrature error $\theta_e$. Again, the teachings of this invention could also be applied to a four point QPSK signal as illustrated in FIG. 2B.

FIG. 2A, therefore, effectively illustrates the distortion of an RF signal which does not exhibit the distortion of parameter c (DC offset) as described in the "Description of Related Art" but does show distortion of parameters a and b. According to the best prior art known technique, trial and error were generally necessary in order to bring the distortion back to an acceptable level.

It has been discovered, however, that with as few as three independent measurements, with predetermined perturbations of amplitude and phase, a modulator's amplitude imbalance and quadrature error can be calculated and corrected for.

In order to understand the method steps, it is desirable to first understand the mechanics of a quadrature modulated signal and the effect that $\Delta$ and $\theta_e$ have thereon.

The output of a quadrature modulator for sinusoidal inputs and modulator phase and amplitude imbalance is:

$$M_{out}=(1+\Delta)\sin(\omega_m t+\theta_m)\cos(\omega_c t+\theta_c)+\cos \omega_m t \sin(\omega_c t+\theta_c+\theta_e) \quad (1)$$

where
$\Delta$ is the amplitude imbalance, $\omega_m$, $\omega_c$ are a sinusoidal input and carrier frequencies; and,
$\theta_m$, $\theta_c$, $\theta_e$ represent the input phase error, carrier phase and modulator phase imbalance (error) respectively. Expanding equation (1) for small values of $\theta_m$, $\theta_e$, results in the following:

$M_{out}$=cos $\theta_c$([1+$\Delta$]sin $\omega_m t$ cos $\omega_c t$+$cos$ $\omega_m t$ sin $\omega$ $_c t$)− sin $\theta_c$([1+$\Delta$]sin $\omega_m t$ sin $\omega_c t$−cos $\omega_m t$ cos $\omega_c t$)+ cos $\theta_c$([1+$\Delta$]sin $\theta_m$ cos $\omega_m t$ cos $\omega_c t$+sin $\theta_e$ cos $\omega$ m$t$ cos $\omega_c t$)+ sin $\theta_c$([1+$\Delta$]sin $\theta_m$ cos $\omega_m t$ sin $\omega_c t$+sin $\theta_e$ cos $\omega$ m$t$ sin $\omega_c t$) (2)

With amplitude and phase imbalance correction ($\Delta$=0 and $\theta_m$=−$\theta_e$), equation (2) reduces to a one sided spectrum, namely:

$M_{out}$=cos $\theta_c$(sin $\omega_m t$ cos $\omega_c t$+cos $\omega_m t$ sin $\omega_c t$)−sin $\theta_c$(sin $\omega_m t$ sin $\omega_c t$−cos $\omega_m t$ cos $\omega_c t$)=sin[($\omega_m$+$\omega_c$)$t$+$\theta_c$] (3)

Accordingly, phase imbalance correction is possible by pre-distorting the input signal phase ($\theta_e$=$\theta_m$).

A. Extracting $\theta_e$ and $\Delta$

To find $\theta_e$ and $\Delta$ set $\theta_m$=0 and to simplify the calculation without loss of generality, set $\theta_c$=0.

Equation (1) reduces to:

$$M_{out}=(1+\Delta)\sin \omega_m t \cos \omega_c t+\cos \omega_m t \sin(\omega_c t+\theta_e) \quad (4)$$

Expanding equation (4) produces $$M_{out} = \cos[(\omega_c + \omega_m)t]\left(1 + \frac{1}{2}\Delta\right) - \frac{1}{2}\sin\theta_e\sin(\omega_c + \omega_m)t + \frac{1}{2}\Delta\cos(\omega_c - \omega_m)t - \frac{1}{2}\sin\theta_e\sin(\omega_c - \omega_m)t \quad (5)$$

Assuming that the imbalance in angle and amplitude is small, the difference frequencies' component is:

$$R_0 = \frac{1}{2}\sqrt{\Delta^2 + \theta_e^2} \quad (6)$$

or $$4R_0^2 = \Delta^2 + \theta_e^2 \quad (7)$$

The next step is to solve unknowns $\Delta$ and $\theta_e$ by making three experiments. In the first experiment introduce errors both in amplitude, $\rho$ and in phase $\phi$. In the second experiment change the sign $\rho$, i.e., introduce attenuation to the second channel while keeping the introduced phase error the same. In the third experiment introduce phase error to the second channel without changing attenuation.

The three constructed equations are as follows:

$$4R_1^2=(\Delta+\rho)^2+(\theta_e+\phi)^2 \quad (8)$$

$$4R_2^2=(\Delta-\rho)^2+(\theta_e+\phi)^2 \quad (9)$$

$$4R_3^2=(\Delta+\rho)^2+(\theta_e-\phi)^2 \quad (10)$$

and the equation $\theta_e$ and $\Delta$ become:

$$\theta_e = \frac{R_1^2 - R_3^2}{\varphi} \quad (11)$$

$$\Delta = \frac{R_1^2 - R_2^2}{\rho} \quad (12)$$

B. Pre-Distortion Technique

In order to correct for phase and amplitude imbalance. it is important to insert the input angle correction to be $\theta_m$=−$\theta_e$ and also correct for $\Delta$ in equation (1) for the eight respective phases. To make the I and Q channels signal characteristics (shape) similar, it is necessary to convert from cos $\omega_m t$ to $$\cos\left(\omega_m t + \frac{\theta_e}{2}\right)$$

and from sin $\omega_m t$ to $$\sin\left(\omega_m t - \frac{\theta_e}{2}\right)$$

at the constellation values (instead of invoking the full angle correction on one of the channels).

The table below shows the coordinates of the reference constellation for π/4 DQPSK (eight points, see FIG. 1A), and the coordinates of the pre-distorted constellation. The constellation points in the right column will correct for amplitude imbalance +$\Delta$ and quadrature error +$\theta_e$. For a transmitter that has programmable constellation points, this embodiment provides a complete solution for correction of both amplitude imbalance and quadrature $\theta_e$ error.

| reference constellation coordinates | pre-distorted constellation coordinates |
|---|---|
| 1,0 | $1, -\dfrac{\theta_e}{2}$ |
| $\dfrac{1}{\sqrt{2}}, \dfrac{1}{\sqrt{2}}$ | $\dfrac{1}{\sqrt{2}}\left(1 - \dfrac{\theta_e}{2}\right), \dfrac{1}{\sqrt{2}}\left(1 - \dfrac{\theta_e}{2} - \Delta\right)$ |
| $\dfrac{1}{\sqrt{2}}, -\dfrac{1}{\sqrt{2}}$ | $\dfrac{1}{\sqrt{2}}\left(1 + \dfrac{\theta_e}{2}\right), -\dfrac{1}{\sqrt{2}}\left(1 + \dfrac{\theta_e}{2} - \Delta\right)$ |
| 0,−1 | $\dfrac{\theta_e}{2}, -(1 - \Delta)$ |
| $-\dfrac{1}{\sqrt{2}}, -\dfrac{1}{\sqrt{2}}$ | $-\dfrac{1}{\sqrt{2}}\left(1 - \dfrac{\theta_e}{2}\right), -\dfrac{1}{\sqrt{2}}\left(1 - \dfrac{\theta_e}{2} - \Delta\right)$ |
| −1,0 | $-1, -\dfrac{\theta_e}{2}$ |
| $-\dfrac{1}{\sqrt{2}}, \dfrac{1}{\sqrt{2}}$ | $-\dfrac{1}{\sqrt{2}}\left(1 + \dfrac{\theta_e}{2}\right), \dfrac{1}{\sqrt{2}}\left(1 + \dfrac{\theta_e}{2} - \Delta\right)$ |
| 0,1 | $-\dfrac{\theta_e}{2}, 1 - \Delta$ |

Figure 3:
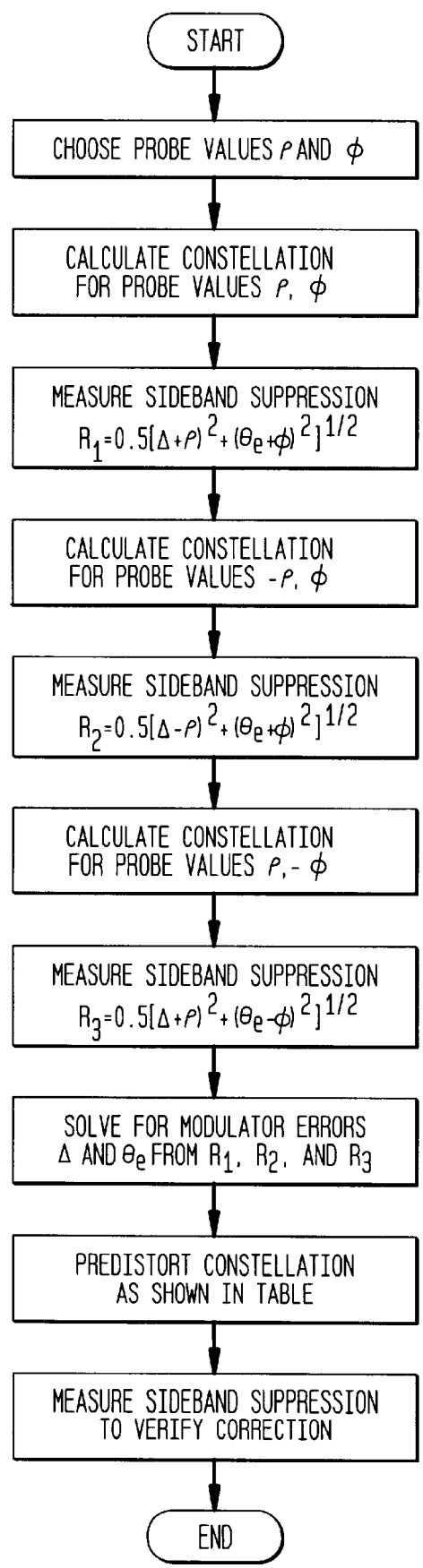
FIG. 3 is a procedure diagram for one embodiment of the amplitude imbalance and quadrature error correction procedure.

FIG. 3 illustrates the method steps, in a graphical form, that are inherent in equations (1) through (12) set forth above.

In addition to the foregoing, there is an alternative embodiment presented herewith which comprises an additional, or fourth step, to determine the unknown control scale factor A for balance adjustments. Control scale factors are added to the above calculations (1) through (12) to account for the unknown scale relationships between the gain balance control variables in the modulator circuitry and the theoretical balance settings in the modulator input. These scale factors are implicitly set to "1" in the equations (1) through (12) set forth above, but must be estimated in order to use the inventive method in some practical calibration environments.

Figure 4:
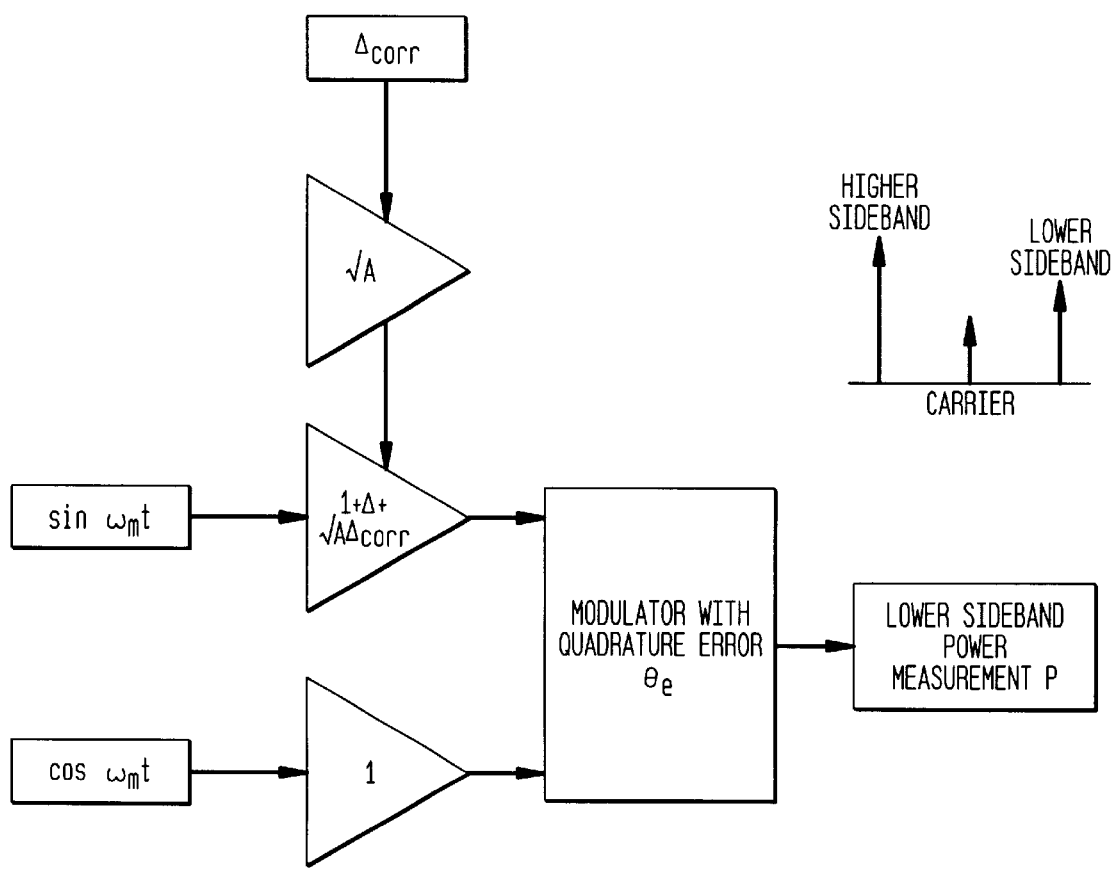
FIG. 4 is,an equivalent circuit for an IQ modulator with amplitude imbalance.

FIG. 4 shows an equivalent circuit for modulator gain balance adjustment. The Q modulation signal has unity gain. The I modulation signal is assumed to pass through an amplifier whose gain is the sum of three components: unity, the unknown imbalance value, $\Delta$, and a third variable, $\sqrt{A}\Delta\Delta_{corr}$, controlled by the balance compensation setting.

$\Delta_{corr}$ is used to cancel the imbalance in the I and Q paths, but $\sqrt{A}$, which establishes the sensitivity of the balance control is often unknown or different from unit to unit. To handle the uncertainty of the control gain variable, A, the following is defined:

$$\Delta' = \Delta/\sqrt{A} \quad (13)$$

then the lower side-band power can be expressed as $$P = A(\Delta' + \Delta_{corr})^2 + (\theta_e/2)^2 \quad (14)$$

In this derivation there is no attempt to cancel the effect of $\theta_e$, but instead to solve for $\Delta'$ so that it is possible to set $\Delta_{corr} = -\Delta'$ to cancel the gain imbalance component.

The following calculations indicate how the balance control variable setting $\Delta_{corr}$ and the unknown control scale factor A is determined given the relationships set forth in equations 7, 8 and 9 above.

Referring to the above, equations 7, 8 and 9 are modified as follows:

$$P_0 = A(\Delta')^2 + E_\theta \quad (15)$$

$$P_1 = A(\Delta' + \rho)^2 + E_\theta \quad (16)$$

$$P_2 = A(\Delta' - \rho)^2 + E_\theta \quad (17)$$

where:

A is the unknown control scale factor for balance adjustments, $\Delta'$ is the balance control variable setting, $\rho$ is an experimental balance probe value, the P's are the suppressed side band power measures for particular experimental probe settings, and $E_\theta$ is the residual power due to phase imbalance.

First subtracting (17) from (16) and solving for $\Delta'$ gives:

$$\Delta' = (P_1 - P_2)/4A\rho \quad (18)$$

Now adding (16) and (17) gives:

$$P_1 + P_2 = 2(A(\Delta')^2 + A\rho^2 + E_\theta) \quad (19)$$

Combining (15) and (19) and solving for A gives:

$$A = (P_1 + P_2 - 2P_0)/2\rho^2 \quad (20)$$

Although no attempt is made to eliminate the phase imbalance, (18) and (20) indicate that the phase term cancels from the gain balance computation.

Combining (18) and (20) and solving for $\Delta'$ gives:

$$\Delta' = (P_1 - P_2)\rho/(2(P_2 + P_3 - 2P_0)) \quad (21)$$

Once the value of $\Delta'$ is computed, the gain imbalance can be corrected by setting $\Delta_{corr} = -\Delta'$.

Figure 5:
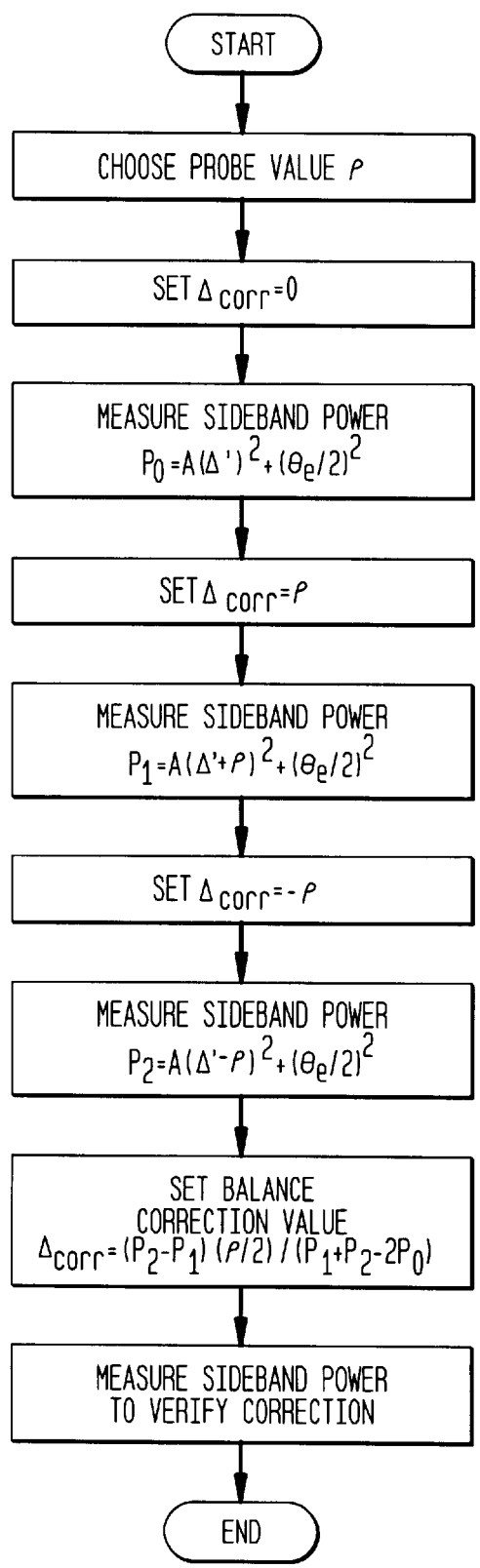
FIG. 5 is a procedure diagram for a second embodiment of the amplitude imbalance correction procedure.

The foregoing steps for determining the balance control variable setting $\Delta_{corr}$ and the unknown control scale factor A are shown in graphical detail in FIG. 5.

In conclusion, in order to determine the amplitude imbalance $\Delta$ and quadrature error $\theta_e$ of a given RF modulator, it is only necessary for a technician to perform a minimum of three specific steps (manually or by computer program), involving two predetermined induced errors $\rho$ and $\phi$, in order to accurately identify the correction factors and, subsequently, provide them as constant inputs to the RF transmitter. According to an alternative embodiment of the same concept, an additional perturbation is made to determine the imbalance referred to the balance control variable setting $\Delta_{corr}$ and the unknown control scale factor A, after which the appropriate adjustments are also made. The foregoing results in substantial savings in time and improvement in equipment performance.

While the invention has been described with reference to the preferred embodiment thereof, it will be appreciated by those of ordinary skill in the art that modifications can be made to the steps of the invention or the system as a whole, without departing from the spirit and scope of the invention.

We claim:

1. A method for detecting and correcting for amplitude $\Delta$ and phase $\theta_e$ imbalances of a quadrature modulator used in an RF transmitter, said method comprising the steps of:

a. perturbing said quadrature modulator with errors in amplitude $\rho$ and phase $\phi$ in three different combinations thereof;

b. measuring the output of said RF transmitter in response to said perturbation and determining the amplitude imbalance $\Delta$ and error $\theta_e$ of said radio transmitter; and, c. providing input biases to said RF transmitter to pre-distort its input signals and minimize the amplitude imbalance $\Delta$ and phase imbalance $\theta_e$ at the output.

2. The method of claim 1 wherein the RF transmitter is disturbed as described in step (a) in the following steps:

d. $4R_1^2 = (\Delta+\rho)^2 + (\theta_e+\phi)^2$
e. $4R_2^2 = (\Delta-\rho)^2 + (\theta_e+\phi)^2$
f. $4R_3^2 = (\Delta+\rho)^2 + (\theta_e-\phi)^2$ and wherein the results thereof provide $\Delta$ and $\theta$ in the following manner:

$$\theta_e = \frac{R_1^2 - R_3^2}{\varphi}$$

$$\Delta = \frac{R_1^2 - R_2^2}{\rho}.$$

3. The method of claim 1 further comprising the disturbance of a system as described in step (a) to determine a balance control variable setting $\Delta_{corr} = -\Delta'$, $\Delta'$ being an imbalance variable, and an unknown balance control scale factor A for said RF transmitter.

4. The method of claim 3 wherein said factor $\Delta_{corr}$ is determined by the following steps:

g. $P_0 = A(\Delta')^2 + E_\theta$
h. $P_1 = A(\Delta'+\rho)^2 + E_\theta$
i. $P_2 = A(\Delta'-\rho)^2 + E_\theta$ where:

A is the unknown control scale factor for balance adjustments, $\Delta'$ is the imbalance variable scaled by $1/\sqrt{A}$, $\rho$ is an experimental balance probe value, and, the P's are the suppressed side band power measures for particular experimental probe settings, and $E_\theta$ is the residual power due to phase imbalance and wherein, $$\Delta_{corr} = (P_2 - P_1)\rho / (2(P_2 + P_3 - 2P_0)).$$

* * * * *